J. A. DYBLIE.
WIND SHIELD PROTECTOR.
APPLICATION FILED FEB. 8, 1917.
1,255,300.
Patented Feb. 5, 1918.
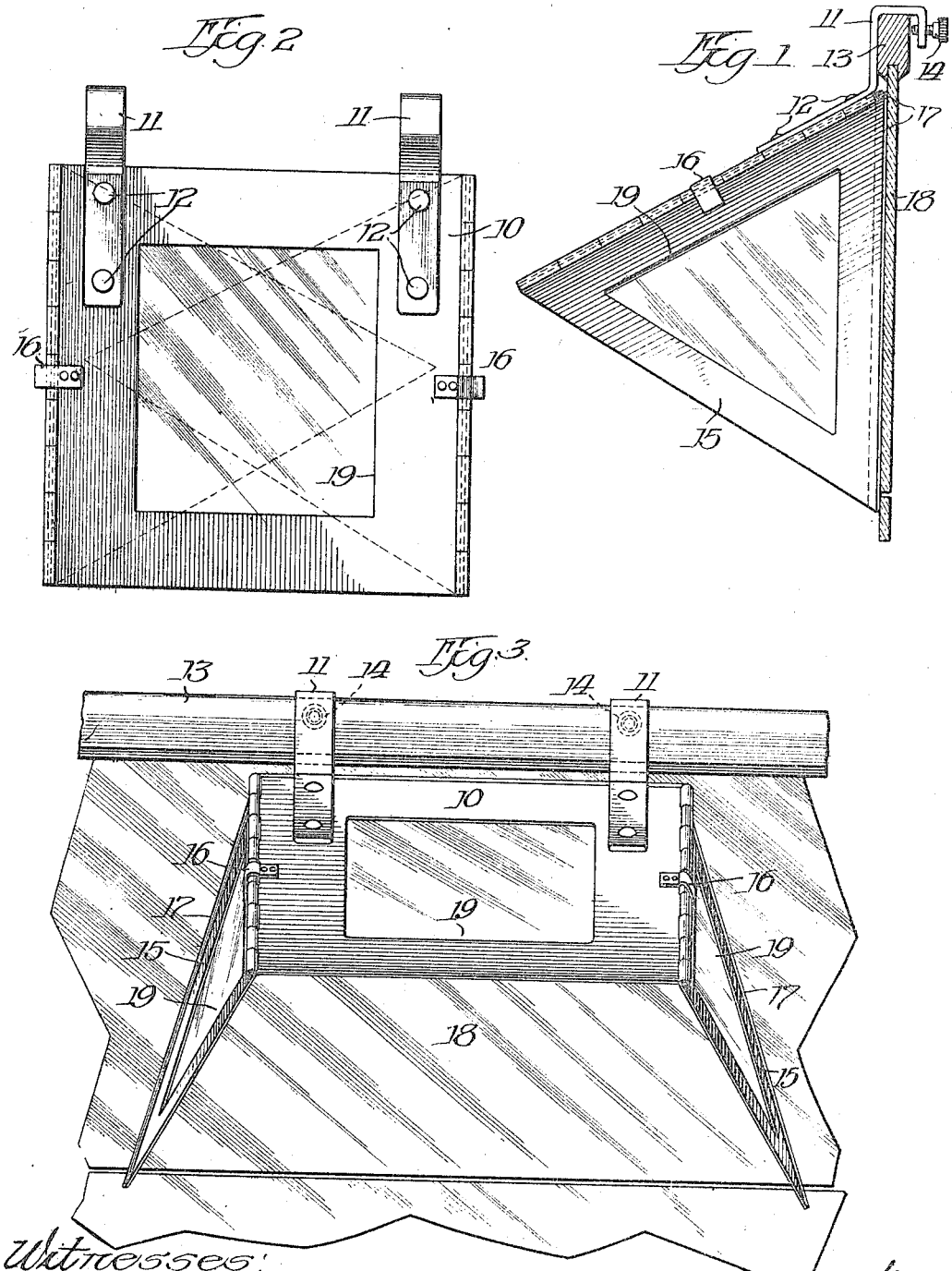

UNITED STATES PATENT OFFICE.

JULIUS A. DYBLIE, OF JOLIET, ILLINOIS.

WIND-SHIELD PROTECTOR.

1,255,300. Specification of Letters Patent. Patented Feb. 5, 1918.

Application filed February 8, 1917. Serial No. 147,381.

*To all whom it may concern:*

Be it known that I, JULIUS A. DYBLIE, a citizen of the United States, residing at Joliet, in the county of Will and State of Illinois, have invented a new and useful Improvement in Wind-Shield Protectors, of which the following is a specification.

My invention relates to a rain or sun protector or hood and is adapted to be attached to the wind-shield of an automobile or truck for the purpose of preventing rain, snow or sleet from striking and sticking to the surface of the glass thus interfering with clear vision through the protected part of the windshield.

It is well known that in driving an automobile during a rain or snow storm the rain or snow will adhere to the front surface of the glass wind-shield so as to make it almost impossible for the driver to see the roadway in front of the machine, thus making it necessary for the driver to frequently clean the glass in order to insure safe driving, and often to open the upper portion of the wind-shield thus subjecting the occupants of the car to drafts of cold air, rain, etc., all of which will be prevented by the use of my improved protector.

Other objects of my invention are to provide a shield which is capable of being readily attached to and removed from the regular wind-shield, which is easily removed and compactly folded to occupy a minimum amount of space when not in use, and which when attached to the wind-shield keeps the portion of the glass to which it is attached clean and insuring a clear field of vision for the driver.

My invention may also be used as a sun-shield for the protection of the eyes of a driver from the sun's rays as they may shine through or be deflected from the surface of the glass thus reducing the liability of accidents.

My protector may be cheaply produced of sheet metal or other material and in practice has proven a highly efficient and desirable article.

My invention will be more readily understood by reference to the accompanying drawings and in which—

Figure 1 is a side view of my improved protector;

Fig. 2 shows the protector in folded position; and

Fig. 3 is a front elevation showing the protector in position on a wind-shield of an automobile.

Referring specifically to the drawings, and in which similar numerals refer to similar parts throughout the several views, the protector consists of a rectangular member 10 extending downwardly and outwardly from the wind-shield, to which is suitably attached metal straps 11. The upper or free ends of said straps 11 are shaped to conform to the contour of the frame 13 of the wind-shield and are clamped thereto by means of the screws 14, the screws having threaded engagement with the straps 11. To both sides of the member 10 is attached side members 15, 15 substantially triangular in shape and connected at one edge to the member 10, the contacting edges of the members 10 and 15 being formed into a hinge and being held together by means of a wire or pin inserted therethrough. Clips 16, 16 are securely riveted to the member 10 and are bent at such an angle as to hold the side members 15, 15 at a pre-determined angle with relation to the member 10 usually a little more than a right angle. Attached to the edges of the members 10, 15, 15 are strips of rubber 17 or other resilient material so as to form a close bearing between the edges of the members 10, 15, and the glass portion 18 of the wind-shield preventing rain or snow being blown in between the edges of the members 10, 15, and the wind-shield, and also to present a gripping surface against the wind-shield thus holding the protector more securely in position, thereby preventing rattling and also preventing the protector from scratching the wind-shield glass.

In order to strengthen the members 10 and 15, I prefer that a panel 19 should be stamped therein thus serving to stiffen the said members and render them less liable to vibration.

As will be readily understood, the use of the device is extremely simple. When desired to be placed in use, the side members 15 are opened out into position, the screws 14 are loosened sufficiently to allow the device to be hooked onto the top of the wind-shield frame at any point on said frame and are then tightened sufficiently to securely clamp and hold the device in position, or I may prefer to use spring clamps in order to hold the protector in position on the wind-shield. The rubber-tipped edges of the members 10 and 15 will rest against the wind-shield thus forming a support and maintaining the protector at the proper angle with relation to the wind-shield. The clips 16 will prevent the members 15 from spreading too far apart or I may prefer to use a knuckle-hinge between the members 10 and 15. It will be noted also that the side members 15 which are hingedly connected to the member 10 are limited in their movement in one direction by engagement with the wind-shield. When not needed the device may be readily detached from the wind-shield, the side members 15, 15 may be folded inwardly so as to form a flat compact package and the protector shipped under the seat out of the way or carried in any other convenient place.

I claim:

A wind-shield protector comprising a member extending outwardly from the wind-shield, a side member hingedly connected thereto and limited to movement in one direction by engagement with the wind-shield, and means for limiting its movement in the other direction.

Signed at Chicago, Illinois, this 27th day of January, 1917.

JULIUS A. DYBLIE.

Witnesses:
CHARLES F. MURRAY,
MILTON T. MILLER.

Copies of this patent may be obtained for five cents each, by addressing the "Commissioner of Patents, Washington, D. C."